United States Patent
Dorner et al.

(10) Patent No.: US 10,169,803 B2
(45) Date of Patent: Jan. 1, 2019

(54) COLOR BASED SOCIAL NETWORKING RECOMMENDATIONS

(71) Applicant: Amazon Technologies, Inc., Reno, NV (US)

(72) Inventors: Charles Shearer Dorner, Seattle, WA (US); Jenny Ann Blackburn, Seattle, WA (US); Robert Yuji Haitani, Seattle, WA (US); Eva Manolis, Bellevue, WA (US); Timothy Andrew Ong, Sammamish, WA (US); Gonzalo Alberto Ramos, Kirkland, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1053 days.

(21) Appl. No.: 14/315,866

(22) Filed: Jun. 26, 2014

(65) Prior Publication Data
US 2015/0379608 A1 Dec. 31, 2015

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0631* (2013.01); *G06Q 50/01* (2013.01)

(58) Field of Classification Search
CPC ........ G06Q 30/06; G06Q 30/08; G06Q 40/00; G06Q 30/0631; G06Q 50/01
(Continued)

(56) References Cited

U.S. PATENT DOCUMENTS 5,508,718 A 4/1996 Haikin
5,544,284 A 8/1996 Allebach et al.
(Continued)

FOREIGN PATENT DOCUMENTS

CN 107077474 A 8/2017
CN 107077698 A 8/2017
(Continued)

OTHER PUBLICATIONS

Yi-Fan Wang et al. "A personalized recommender system for the cosmetic business", Expert Systems with Applications 26 (2004) 427-434 (Year: 2004).*

(Continued)

*Primary Examiner* — Naeem U Haq
(74) *Attorney, Agent, or Firm* — Knobbe, Martens, Olson & Bear LLP (57) ABSTRACT

Systems and methods are provided for generating social networking recommendations. A color preference of a first user may be determined from a color palette of a first image associated with the user and/or a color palette of an item associated with the user. Other users may be identified that have a similar color preference as the first user based at least in part on the determined color preference of the first user. Interactions between the first user and one or more other users having similar color preferences with respect to the first user may be facilitated. A social networking recommendation may be generated with respect to the one or more other users having similar color preferences with respect to the first user.

17 Claims, 4 Drawing Sheets

(58) Field of Classification Search
USPC .............................................. 705/26.1, 27.1
See application file for complete search history.

(56) References Cited

U.S. PATENT DOCUMENTS

| | | |
|---|---|---|
| 5,684,895 A | 11/1997 | Harrington |
| 5,822,503 A | 10/1998 | Gass, Jr. |
| 6,014,125 A | 1/2000 | Herbert |
| 6,041,311 A * | 3/2000 | Chislenko ......... G06F 17/30699 |
| | | 705/26.7 |
| 6,081,276 A | 6/2000 | Delp |
| 6,124,945 A | 9/2000 | Ishihara et al. |
| 6,385,336 B1 | 5/2002 | Jin |
| 6,513,014 B1 | 1/2003 | Walker et al. |
| 6,577,759 B1 | 6/2003 | Caron et al. |
| 7,136,074 B2 | 11/2006 | Hussie |
| 7,444,658 B1 | 10/2008 | Matz et al. |
| 7,801,893 B2 | 9/2010 | Gulli' et al. |
| 7,961,938 B1 | 6/2011 | Remedios |
| 8,393,002 B1 | 3/2013 | Kamvar et al. |
| 8,416,255 B1 | 4/2013 | Gilra |
| 8,553,045 B2 | 10/2013 | Skaff et al. |
| 8,576,241 B1 | 11/2013 | Kanter et al. |
| 8,587,604 B1 | 11/2013 | Kanter et al. |
| 8,593,680 B2 | 11/2013 | Woolfe et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,396,560 B2 | 7/2016 | Dorner et al. |
| 9,401,032 B1 | 7/2016 | Dorner et al. |
| 9,514,543 B2 | 12/2016 | Dorner et al. |
| 9,524,563 B2 | 12/2016 | Sayre et al. |
| 9,542,704 B2 | 1/2017 | Dorner et al. |
| 9,552,656 B2 | 1/2017 | Dorner et al. |
| 9,633,448 B1 | 4/2017 | Dorner |
| 9,652,118 B2 | 5/2017 | Hill et al. |
| 9,652,868 B2 | 5/2017 | Gunningham et al. |
| 9,659,032 B1 | 5/2017 | Dorner et al. |
| 9,679,532 B2 | 6/2017 | Dorner et al. |
| 9,697,573 B1 | 7/2017 | Haitani et al. |
| 9,727,983 B2 | 8/2017 | Dorner et al. |
| 9,741,137 B2 | 8/2017 | Dorner et al. |
| 9,785,649 B1 | 10/2017 | Dorner et al. |
| 9,792,303 B2 | 10/2017 | Sayre, III et al. |
| 9,898,487 B2 | 2/2018 | Sayre, III et al. |
| 9,916,613 B1 | 3/2018 | Dorner et al. |
| 2001/0028464 A1 | 10/2001 | Aritomi |
| 2002/0080153 A1 | 6/2002 | Zhao et al. |
| 2003/0004938 A1 | 1/2003 | Lawder |
| 2003/0011612 A1 | 1/2003 | Luo et al. |
| 2003/0083850 A1 | 5/2003 | Schmidt et al. |
| 2003/0142124 A1 | 7/2003 | Takata |
| 2003/0146925 A1 | 8/2003 | Zhao et al. |
| 2004/0090453 A1 | 5/2004 | Jasinschi et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0248081 A1 | 11/2006 | Lamy |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1 | 2/2008 | Lieb |
| 2008/0046424 A1 | 2/2008 | Horton |
| 2008/0069442 A1 | 3/2008 | Itoh |
| 2008/0294600 A1 | 11/2008 | Clark et al. |
| 2008/0301582 A1 | 12/2008 | Gluck |
| 2008/0317336 A1 | 12/2008 | Mojsilovic |
| 2009/0027414 A1 | 1/2009 | Vaughn |
| 2009/0041345 A1 | 2/2009 | Tirumalareddy et al. |
| 2009/0055758 A1 | 2/2009 | Sim et al. |
| 2009/0157595 A1 | 6/2009 | Gubitz |
| 2009/0227375 A1 | 9/2009 | Weisman et al. |
| 2009/0248626 A1 | 10/2009 | Miller |
| 2009/0259567 A1 | 10/2009 | Watts |
| 2009/0276368 A1 * | 11/2009 | Martin ................. G06Q 40/02 |
| | | 705/36 R |
| 2009/0281925 A1 * | 11/2009 | Winter ............... G06Q 17/3025 |
| | | 705/26.1 |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2010/0158412 A1 | 6/2010 | Wang et al. |
| 2011/0029510 A1 | 2/2011 | Kroon et al. |
| 2011/0135195 A1 * | 6/2011 | Marchesotti ......... G06K 9/4652 |
| | | 382/165 |
| 2011/0205231 A1 | 8/2011 | Hartley et al. |
| 2011/0305386 A1 | 12/2011 | Wang et al. |
| 2011/0319160 A1 | 12/2011 | Arn et al. |
| 2012/0036163 A1 | 2/2012 | Myers et al. |
| 2012/0045121 A1 * | 2/2012 | Youngman ......... G06Q 30/0601 |
| | | 382/162 |
| 2012/0075329 A1 | 3/2012 | Skaff et al. |
| 2012/0099784 A1 | 4/2012 | Marchesotti et al. |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2012/0206477 A1 | 8/2012 | Yanagisawa |
| 2013/0013991 A1 | 1/2013 | Evans |
| 2013/0033603 A1 | 2/2013 | Suzuki et al. |
| 2013/0050238 A1 | 2/2013 | Bergou et al. |
| 2013/0148741 A1 | 6/2013 | Steinberg et al. |
| 2013/0159100 A1 * | 6/2013 | Raina ................. G06Q 30/0241 |
| | | 705/14.52 |
| 2013/0226659 A1 | 8/2013 | Patel et al. |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2013/0300761 A1 | 11/2013 | Ahmed |
| 2014/0037200 A1 | 2/2014 | Phillips et al. |
| 2014/0044349 A1 | 2/2014 | Wang et al. |
| 2014/0049799 A1 | 2/2014 | Li et al. |
| 2014/0052584 A1 | 2/2014 | Gershon et al. |
| 2014/0067014 A1 | 3/2014 | Kaula et al. |
| 2014/0089781 A1 | 3/2014 | Hoguet |
| 2014/0153821 A1 | 6/2014 | Masuko et al. |
| 2014/0177952 A1 | 6/2014 | Masuko |
| 2014/0189476 A1 | 7/2014 | Berthelot et al. |
| 2014/0270498 A1 | 9/2014 | Chester et al. |
| 2014/0300775 A1 | 10/2014 | Fan et al. |
| 2014/0304661 A1 | 10/2014 | Topakas et al. |
| 2014/0334722 A1 | 11/2014 | Bloore et al. |
| 2014/0355874 A1 | 12/2014 | Sakamaki et al. |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0324394 A1 | 11/2015 | Becker et al. |
| 2015/0332479 A1 | 11/2015 | Gershon et al. |
| 2015/0356128 A1 | 12/2015 | Nishimura |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379005 A1 | 12/2015 | Dorner et al. |
| 2015/0379006 A1 | 12/2015 | Dorner et al. |
| 2015/0379071 A1 | 12/2015 | Dorner et al. |
| 2015/0379731 A1 | 12/2015 | Dorner et al. |
| 2015/0379732 A1 | 12/2015 | Sayre et al. |
| 2015/0379733 A1 | 12/2015 | Dorner et al. |

(56) References Cited

U.S. PATENT DOCUMENTS

| | | |
|---|---|---|
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |
| 2016/0335784 A1 | 11/2016 | Dorner et al. |
| 2017/0084053 A1 | 3/2017 | Dorner et al. |
| 2017/0098314 A1 | 4/2017 | Sayre et al. |
| 2017/0206061 A1 | 7/2017 | Kumar et al. |
| 2017/0270620 A1 | 9/2017 | Haitani et al. |
| 2018/0025002 A1 | 1/2018 | Dorner et al. |
| 2018/0040142 A1 | 2/2018 | Dorner et al. |

FOREIGN PATENT DOCUMENTS

| | | |
|---|---|---|
| EP | 3 161 677 | 5/2017 |
| EP | 3 161 770 | 5/2017 |
| JP | 2007-286767 A | 11/2007 |
| JP | 2009-181468 A | 8/2009 |
| JP | 2009-251850 A | 10/2009 |
| JP | 2011-154687 A | 8/2011 |
| JP | 2012-221317 A | 11/2012 |
| WO | WO 2014/070914 A1 | 5/2014 |
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

U.S. Appl. No. 14/316,483, filed Jun. 26, 2014, Dorner et al.
Bell, E., Color Detection: Technology on Heels with Lyst Engineering, dated Feb. 22, 2014, retrieved Apr. 7, 2014, <http://developers.lyst.com/data/images/2014/02/22/color-detection/>.
Luo et al., "Novel color palettization scheme for preserving important colors," Proc. SPIE. 5008. Color Imaging VIII: Processing, Hardcopy, and Applications; Jan. 20, 2003.
Montagne et al., "Adaptive color quantization using the baker's transformation," J. Electronic Imaging 15(2); Apr. 2006.
Periasamy et al., "A Common Palette Creation Algorithm for Multiple Images with Transparency Information," IEEE 2009 Intl Conf. on Advances in Computing, Control, and Telecommunication Technologies.
Yu et al., "Contextual algorithm for color quantization," J. Electronic Imaging 12(3); Jul. 2003.
"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.
Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.
Csurka, Gabriela, et al.; "Learning moods and emotions from color combinations," Proceedings of the Seventh Indian Conference on Computer Vision, Graphics and Image Processing, pp. 298-305; New York; Dec. 12, 2010.
Das et al., "Indexing flowers by color names using domain knowledge-driven segmentation," Proc. The Fourth IEEE Workshop on Applications of Computer Vision; pp. 94-99; 1998.
Dorner, C.S., Automatic Image-Based Recommendations Using a Color Palette, U.S. Appl. No. 14/316,268, filed Jun. 26, 2014.
Global Color Survey, http://www.colorcom.com/global-color-survey, Feb. 1, 2001, accessed Sep. 11, 2015.
Heer, Jeffrey, et al.; "Color naming models for color selection, image editing and palette design," Proceedings of the 2012 ACM Annual Conference on Human Factors in Computing Systems, pp. 1007-1016; New York; May 5, 2012.
Lawder, Jonathan, "The Application of Space-filling Curves to the Storage and Retrieval of Multidimensional Data," PhD thesis; Sections 4.3.5.1, p. 68, and 6.5, pp. 121-130; Jan. 1, 2000.
Tremeau et al., "A vector quantization algorithm based on the nearest neighbor of the furthest color," Proceedings of International Conference on Image Processing, vol. 3, pp. 682-685, Oct. 26-29, 1997.
Tropf, H. et al., "Multidimensional range search in dynamically balanced trees," Angewandte Informatik (Applied Informatics), pp. 71-77; Braunschweig, Germany; Feb. 1, 1981.
Wang et al., "Contextual Dominant Color Name Extraction for Web Image Search," 2012 IEEE International Conference on Multimedia and Expo Workshops (ICMEW), pp. 319-324.
Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.
International Search Report and Written Opinion in PCT/US2015/037469 dated Oct. 1, 2015.
International Search Report and Written Opinion in PCT/US2015/037456 dated Sep. 9, 2015.
International Search Report and Written Opinion in PCT/US2015/037465 dated Oct. 27, 2015.
International Search Report and Written Opinion in PCT/US2015/037481 dated Sep. 14, 2015.
"Color Blind Assistant." iPhone Apps Versions 2.61 and 2.62; Release date Oct. 14-15, 2009; pp. 1-7.
"Color Name & Hue." Wayback Machine Archive; May 16, 2013; pp. 1-17. <http://web.archive.org/web/20130516202647/http://www.color-blindness.com/color-name-hue>.
"HTML Color Picker," Wayback Machine Archive; Feb. 15, 2013; 1 page. <http://web.archive.org/web/20120215181242/http://imagecolorpicker.com/>.
"Tin Eye Labs." Wayback Machine Archive; Sep. 20, 2012; pp. 1-3. <http://web.archive.org/web/20120920051712/http://labs.tineye.com/color/>.
Delon, J., et al., Automatic Color Palette, Proceedings of the International Conference on Image Processing, vol. 2, Sep. 11-14, 2005, pp. 706-709.
Nickerson, D., et al., Central Notations for ISCC-NBS Color Names, Journal of the Optical Society of America, vol. 31; pp. 587-591; Sep. 1941.
Balasubramanian, Raja, et al.; Sequential Scalar Quantization of Color Images, Journal of Electronic Imaging, vol. 3, No. 1, pp. 45-59; Jan. 1994.
Manjunath, B.S.;Color and Texture Descriptors; 2001; IEEE; vol. 11 No. 6; pp. 703-714.
Office Action in European Application No. 15734006.8, dated Dec. 21, 2017.
International Search Report and Written Opinion of the International Searching Authority, dated Sep. 14, 2015, for PCT Application No. PCT/US2015/037494; 11 pp.
Das et al, Indexing Flower Patent Images Using Domain Knowledge, IEEE Intelligent Systems, vol. 14, No. 5; 1999, pp. 24-33.

\* cited by examiner

COLOR BASED SOCIAL NETWORKING RECOMMENDATIONS

BACKGROUND

In many computing-centric commerce models, users are able to efficiently view and purchase a wide variety of items, over computer networks. In many scenarios, a particular network resource, such as a commerce network site, can present items (e.g., goods and/or services) associated with different colors. The items may be depicted in photographs or other images presented via the network site. Users of such commerce network sites and other network sites may have certain color preferences.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure corresponds to methods and systems for providing color-related social network recommendations. Often, users have particular color preferences with respect to clothing, makeup, furniture, jewelry, and other items. Such users may wish to interact with other users having similar color preferences. For example, a given user may wish to learn what items other users with a similar color preference are purchasing or what items in which other users with similar color preferences are interested, as the given user may be interested in purchasing or otherwise utilizing such an item. Further, a given user may want to ask the opinion of another user having similar tastes regarding a given item or set of items, such as color palettes, clothing, furniture, appliances, and other items. For example, a user trying to decide what to wear or what to purchase may want to seek the opinion of another user having similar color tastes. Still further, a user may simply wish to socialize via an electronic social network or otherwise with other users having similar tastes in color. Aspects of the present disclosure relate to determining color preferences of a user and to determining color preferences of a user by determining palettes of one or more images provided by or associated with the user and to identifying users that have similar color preferences. Additional aspects of the present disclosure relate to enabling users that have similar color preferences to interact and share color-related information, such as item purchases, color palettes, and opinions.

In accordance with an illustrative embodiment, a color-related social network recommendation service identifies color preferences of a user and uses such identified color preferences to identify similar users. One or more techniques may be used singly or in combination. A given user may be associated with one or color palettes. The association may be based on, in whole or in part: an affirmative selection of a palette by the user; palettes associated with items purchased by the user (e.g., as determined from the user's purchase history); palettes associated with items browsed by the user (e.g., as determined from the user's browse history); palettes of items in the user's home (e.g., the user's wardrobe); searches performed by the user (e.g., search for colors or keyword searches that may be related to palettes); color palettes of items the user has liked on social networking sites, user images, etc. Metadata identifying the color palettes associated with the user may be stored in association with the user's account record. Users that are associated with similar palettes (e.g., within a specified range of similarity) may be determined. Those users associated with similar color palettes may be identified to one another as a recommended social networking partner or group member. For example, an implicit group of users may be defined based at least in part on the similarity of their associated color palettes. The implicit group may be identified on a social networking page. By way of illustration, a given user may be identified by a user name (which may be an alias name), a representative image (which may be a photograph or graphic provided or selected by the user), the user's preferred color palettes, the user's item preferences, brand preferences, etc. Metadata may optionally be associated with individual palettes, for purposes of textually indicating the color(s) included in the color palette using color names or other color identifiers (including names expressed using ASCII characters, icons, or other such data), and optionally indicating their format, tags, associations, sources, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in creating the color palette), or the like. For more details on color searching based on a keyword, see U.S. patent application Ser. No. 14/316,153, entitled "IDENTIFYING DATA FROM KEYWORD SEARCHES OF COLOR PALETTES," filed on Jun. 26, 2014; U.S. patent application Ser. No. 14/315,914, entitled "GENERATING VISUALIZATIONS FROM KEYWORD SEARCHES OF COLOR PALETTES," filed on Jun. 26, 2014; U.S. patent application Ser. No. 14/315,913, entitled "DETERMINING AFFILIATED COLORS FROM KEYWORD SEARCHES OF COLOR PALETTES," filed on Jun. 26, 2014; U.S. patent application Ser. No. 14/315,995, entitled "IDENTIFYING DATA FROM KEYWORD SEARCHES OF COLOR PALETTES AND KEYWORD TRENDS," filed on Jun. 26, 2014; U.S. patent application Ser. No. 14/315,947, entitled "IDENTIFYING DATA FROM KEYWORD SEARCHES OF COLOR PALETTES AND COLOR PALETTE TRENDS," filed on Jun. 26, 2014; and U.S. patent application Ser. No. 14/315,938, entitled "DETERMINING COLOR NAMES FROM KEYWORD SEARCHES OF COLOR PALETTES," filed on Jun. 26, 2014, each of which is incorporated by reference herein in its entirety.

In particular, a user's color preferences may be explicitly provided by the user via a form or otherwise. For example, a form provided to the user may textually and/or via images describe or depict color palettes (including one or more colors). The user may designate one or more palettes as preferred palettes and may designate one or more palettes as disfavored/disliked palettes. Optionally, a user may indicate the strength of a preference via a score or a textual rating. For example, a user may indicate that on a scale of 1-10, with 1 being the least preferred and 10 being the most preferred, the user's preference with respect to one or more color palettes. By way of further example, a user may select or enter a preference description, such as "strongly like," "somewhat like," "indifferent," "somewhat dislike," or "strongly dislike." Of course, other preference indicators may be used. The user's explicit color preference indication(s) may be stored in a user account record.

In accordance with an illustrative embodiment, an image processing service accesses one or more color images submitted by the user and/or obtained from a social networking page associated with the user. The images may depict one or more items or designs, where the user indicates or it is otherwise determined that the user prefers one or more colors of the item or design. For example, the color images may be of clothing items in the user's wardrobe, of the user's furniture, and/or of items that the user likes. The image processing service generates one or more color palettes from the color images (e.g., based on palette generation criteria). Optionally, the image processing service determines color names for the generated palettes. Color palette information corresponding to the generated color palettes may be stored in association with the user's account. For example, the color palette information may comprise the color palette itself and/or the color name(s) associated with the color palette, and an indication that the color palette is a preferred color palette of the user. Several different color palettes may be generated based on the user's image. A generated preference indication, such as a preference score and/or ranking, may be generated based at least in part on the frequency each of the generated palettes appears in the user's images. The generated preference indication(s) may be stored in association with the user's account and in association with the color palette information.

In accordance with an illustrative embodiment, color palette information may be accessed from a user's purchase or browse history. For example, when a user purchases or otherwise browses an item, a record of the purchase or selection of the item may be stored in association with the user's account. The purchase record may include metadata associated with the item, such as a name of the item, a color name, a color image, an item type (e.g., blouse, skirt, shoes), and an item category (e.g., clothing, furniture, appliances, etc.). The user's color preference, including the user's color preference for different item types and categories, may be determined from the color palette information included in the metadata associated with the items purchased by the user. A color preference indication, such as a preference score and/or ranking, may be generated based at least in part on the frequency each of the color palettes appear in the user's purchases. The generated color preference indication(s) may be stored in association with the user's account.

User color preference information may also be determined from a social networking service utilized by the user. In accordance with another illustrative embodiment, a user's existing social network may be determined from information the user has made accessible to a color-related social networking service. For example, the user may have uploaded or otherwise provided the color-related social networking service with access to the user's contact records that may include names, email addresses, and social network site links. For example, the user may have uploaded or otherwise provided the color-related social networking service with access to at least portions of the user's electronic communications (e.g., who the communications were directed to or received from), such as emails, SMS messages, video chats, or the like. The user's social network may also be obtained from a social networking site. For example, the color-related social networking service may access a user's social graph that depicts personal relations of the user (e.g., indicates other users with whom the user has an established social network relationship).

By way of further example, given the appropriate permissions, the color-related social networking service may access user objects made available via the social networking site (e.g., user images and associated metadata, such as descriptions of items in the images, optionally including color palette information, and user ratings or feedback regarding such objects). The user's color preferences for different item types and categories may be determined from the social networking data, such as color name data, item descriptions, images, etc. The frequency in which data corresponding to a given color palette appears in the user's social networking data may also be used to determine the user's color preference(s). By way of example, the images may be processed to determine respective color palettes and color names for the color palettes as similarly described elsewhere herein. A color preference indication, such as a preference score and/or ranking, may be generated based at least in part on the frequency a given color palette, color name, or other color identifier occurs with respect to the social networking data. The generated color preference indication(s) may be stored in association with the user's account. Thus, a user's color preferences may be determined based on images and from the user's social network.

As noted above, a user's color preference information may be determined from a variety of sources. The color preference information from the variety of sources may be combined to form a unified color preference determination and ranking. In generating a unified color preference determination and ranking, color preference information from certain sources may be weighted differently than color preference information from other sources. For example, the user's explicit color preference indications may be assigned the highest weighting, the color preference indications determined from the user's purchase or browse history may be assigned the next highest weighting, and the color preference indications determined from the user's social networking information may be assigned the third highest weighting, and so on. The foregoing is just one example weighting scheme and other weighting schemes may be used. For example, the color preference indications determined from the user's social networking information may be assigned the highest weighting, the user's explicit color preference indications may be assigned the next highest weighting, and the color preference indications determined from the user's purchase or browse history may be assigned the third highest weighting, and so on.

Based at least in part the color preference indication(s) (e.g., the unified color preference determination and/or ranking) for a given user, in accordance with an illustrative embodiment, other users having the same or similar color preferences may be identified. A user's color preference indication may optionally be used as a user fingerprint to identify the user.

By way of illustration, the social networking service may identify other users that have the same most preferred color palette, and/or may identify other users that have the same ranking of multiple preferred color palettes, for at least a portion of the user's color palette rankings (e.g., the top three ranked color palettes). By way of further example, the social networking service may identify users that have the same most preferred palette and the same next two most preferred palettes, even though the ranking of the next two most preferred palettes may differ. By way of illustration, in this example if User 1 and User 2 have the same most preferred palette (palette A), and User 1's second most preferred palette is palette B and third most preferred palette is palette C, while User 2's second most preferred palette is palette C and third most preferred palette is palette B, then in this illustration User 1 and User 2 will be identified as "matching users" with similar enough tastes in palettes so as to be grouped together for one or more of the services discussed herein. By way of further illustration, in another embodiment, two users may be considered a match only if their three most preferred palettes have the same ranking. By way of yet further illustration, two users may be considered a match only if their two most preferred palettes have the same ranking and they have the same least preferred palette.

Optionally, a first color palette may be considered the same as a second, different color palette if their respective primary colors are within a threshold distance. For example, the threshold may indicate a maximum color distance, wherein if the respective primary colors are less than the maximum color distance apart, color palettes are considered the same color palettes for purposes discussed herein. An example of such a formula is one based on a human perceptible color difference. Various color distance formula (e) or model(s), such as CIEDE2000, CMC 1:c, or the like, can be utilized to compute color distance between colors, and the computed color distance may be compared to the threshold to determine whether the color distance falls within or outside of the threshold. For more information on how to determine a human perceptible color difference and the human color distance formula, please see U.S. patent application Ser. No. 14/316,483, entitled "IMAGE-BASED COLOR PALETTE GENERATION," filed on Jun. 26, 2014; and U.S. patent application Ser. No. 14/316,530, entitled "IMAGE-BASED COLOR PALETTE GENERATION," filed on Jun. 26, 2014; U.S. patent application Ser. No. 14/316,528, entitled "IMAGE-BASED COLOR PALETTE GENERATION," filed on Jun. 26, 2014; and U.S. patent application Ser. No. 14/316,549, entitled "IMAGE-BASED COLOR PALETTE GENERATION," filed on Jun. 26, 2014, each of which is incorporated by reference herein in its entirety.

Optionally, a user may define how closely or loosely another user's color preferences need to be in order for the other user to be considered a suitable social network contact, and for one or more user interaction services to be provided with respect to the user. Optionally, a system operator provides such definition, or both a user and a system operator may contribute to the definition of how closely or loosely another user's color preferences need to be in order for one or more of user interaction services to be provided with respect to the user. As yet another option, a given user may opt-in or opt-out of one or more user interaction services. Users that have been determined to have sufficiently similar color preferences may be logically grouped together. As another option, a name is automatically generated for a grouping of users that have sufficiently similar color preferences. In yet another option, the generated group name may be based on, and include in whole or in part, a name of the color palette most preferred by the group (e.g., the "Greens").

In one embodiment, the color-related social network recommendation service may be provided to two or more users that have been determined to have sufficiently similar color preferences and may provide for sharing user information, such as profile information, purchase information, media, color palettes, etc., of one user with the other user. The profile information may include a user identifier (e.g., a user's actual name or an alias), a user's color preferences (e.g., top five most preferred color palettes in ranked order, three least preferred color palettes in ranked order, etc.), a user's preferred items (e.g., types of clothing or accessories preferred by a user), a user's preferred brands, a user's geographical location (e.g., by region, state, city, neighborhood, etc.), etc. By way of example, the purchase information for an item may include a unique item identifier, an item type identifier (e.g., a name, a Universal Product Code (UPC), a European Article Number (EAN), an International Standard Book Number (ISBN), etc.), an item category identifier, item color information (e.g., color palettes associated with the item), affiliated colors associated with the color palette of the item, item price, etc. As yet another option, the shared purchase information may be provided in association with a link or other control via which the recipient user may initiate the purchase of the item from a commerce service.

In another embodiment, the color-related social network recommendation service may be provided to two or more users that have been determined to have sufficiently similar color preferences and may enable users to communicate with each other via a social networking page, short messages, emails, audio/video calls, and/or otherwise. In yet another embodiment, the color-related social network recommendation service provides a voting service, where users of a group can vote on whether they like or dislike a color palette, or an item, or an item in a given color palette. The vote results may be shared among users having sufficiently similar color preferences.

Optionally, users that have been logically grouped together based at least in part on their color preferences may be extended an invitation to join the group. The color-related social network recommendation service may detect whether or not a given user accepted the invitation, and users that have not accepted the invitation or been provided with the invitation may be precluded from participating in certain or all interaction services with respect to the group. For example, a non-group member may be inhibited to communicating with other group members, from voting on color palettes and items, from receiving profile information of users in the group, etc. User interaction may be enabled on a social networking site, a commerce site, or elsewhere.

Overview of an Example Embodiment

Figure 1:
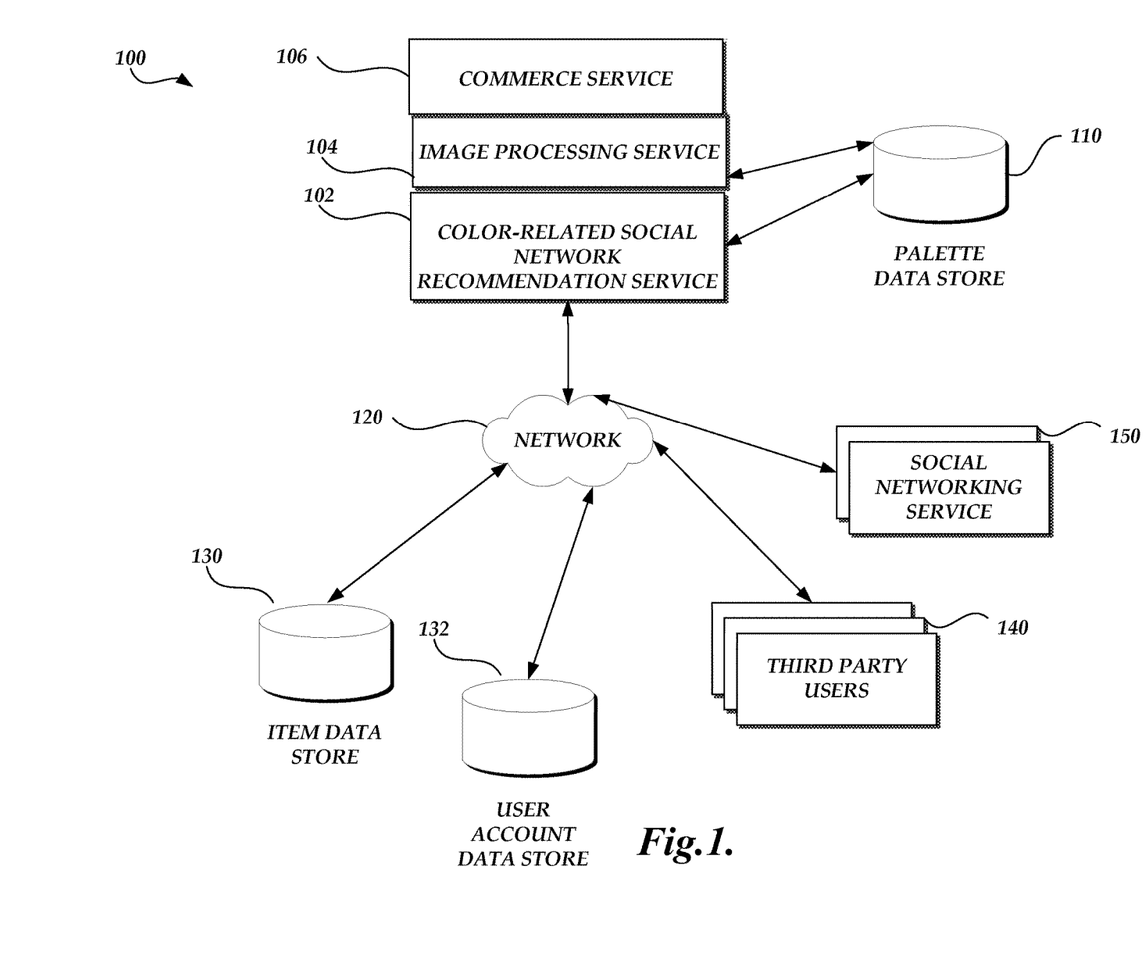
FIG. 1 is a block diagram illustrating one embodiment of an operating environment including an image processing service for palette generation based on color images and a color-related social networking service.

FIG. 1 illustrates an embodiment of a color-related social network recommendation processing environment 100 that can implement features described herein in the context of an example color-related social network recommendation service 102. In some embodiments, the color-related social network recommendation processing environment 100 includes the color-related social network recommendation service 102, an image processing service 104, a commerce service 106, a palette data store 110, a network 120, an item data store 130, a user account data store 132, third party users 140, and social networking services 150. In some embodiments, various components of the color-related social network recommendation processing environment 100 are communicatively interconnected with one another via the network 120. The color-related social network recommendation processing environment 100 may include different components, greater or fewer number of components, and can be structured differently. For example, there can be more than one data store or other computing devices in connection with the color-related social network recommendation service 102. As another example, components of the color-related social network recommendation processing environment 100 may communicate with one another, with or without the network 120.

The color-related social network recommendation service 102 can correspond to any system capable of performing the processes described herein. The color-related social network recommendation service 102 may be implemented by one or more computing devices. For example, the color-related social network recommendation service 102 may be implemented by computing devices that include one or more processors to execute one or more instructions, memory, and communication devices to transmit and receive data over the network 120. In some embodiments, the color-related social network recommendation service 102 is implemented on one or more backend servers capable of communicating over a network. In other embodiments, the color-related social network recommendation service 102 is implemented by one or more virtual machines in a hosted computing environment (e.g., a "cloud" computing environment). The hosted computing environment may include one or more provisioned and released computing resources, which computing resources may include computing, networking or storage devices.

In one aspect, the color-related social network recommendation service 102 can correspond to one or more applications that perform, individually or in combination, the recommendation and user interaction functions described herein, including one or more of identifying users that have similar color preferences and providing interaction services to such users, sharing user profile information, enabling such users to communicate, enabling such users to share color-related purchase information and color palettes, enabling such users to vote for colors and items, etc. In another aspect, the color-related social network recommendation service 102 may be configured to identify and share color trends among users sharing color preferences.

The color-related social network recommendation service 102 may be communicatively connected to the palette data store 110. The palette data store 110 can generally include any repository, database, or information storage system that can store palette data and associated metadata.

The color palette data stored in the palette data store 110 can be collections of colors, including collections of colors generated by a user and/or system based at least in part on human color preferences, optionally with an associated weight and date of creation. Palettes may be generated from images, such as user submitted images or item pages, using the image processing service 104. Palette data can be of various formats, such as lists, vectors, arrays, matrices, etc. Metadata can be associated with individual palettes, for purposes of textually indicating the color(s) included in the color palette, and optionally indicating their format, semantics, features, conditions, sources, date of creation/editing, associated demographics (e.g., geographical region, age, gender, ethnic group, etc., of users that provided input used in creating the color palette), or the like. The color palettes may have been ranked or voted on by people to indicate which combinations of colors are more preferable, visually appealing, popular, or the like. Such ranking and/or votes may be stored and may be used to weight color palettes. Using an initial color or colors, an ordered list of affiliated colors can be generated where a given affiliated color is ranked based at least in part on the popularity of the combination of the initial color or colors with that affiliated color. The color palette can be built by adding an affiliated color to the colors in the color palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the color palette. The color palettes generated using the affiliated color process may be used to provide color-related recommendations for colors or colored items that would go well with another color or colored item. Particular color palettes may be associated with a particular community that includes a biased population (e.g., that are related based on geographical region, age, gender, ethnic group, preferences, social network, etc.), such a group of users having similar color preferences. This enables providing recommended colors to users that have a known and/or inferred bias that corresponds to a palette of a community associated with such color palette bias.

In some embodiments, a first color can be selected by a program or a user and a plurality of color palettes can be identified from a data store of color palettes containing that color (or a sufficiently similar color). From those palettes, a list of affiliated colors can be generated by identifying the other colors in the color palettes. For each affiliated color in the list, a weight can be assigned based on the ranking, rating, and/or number of votes the containing palette has received. The list of affiliated colors can be sorted based on the assigned weights. The program or user can select an affiliated color from the sorted list to add to a custom color palette containing the initial color. When the selected affiliated color is added to the color palette, a new list of affiliated colors can be generated based at least in part on the colors in the color palette that allows the program or user to continue to build the color palette. For more example details on extracting colors from an image and building a color palette, see applications U.S. patent application Ser. No. 14/316,483, entitled "IMAGE-BASED COLOR PALETTE GENERATION," filed on Jun. 26, 2014; and U.S. patent application Ser. No. 14/316,292, entitled "BUILDING A PALETTE OF COLORS BASED ON HUMAN COLOR PREFERENCES," filed on Jun. 26, 2014, each of which is incorporated by reference herein in its entirety. For more details on generating a weighted or ordered list of affiliated colors or generating a color palette using affiliated colors, see application U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety.

The commerce service 106 may provide an electronic catalog to which third party users 140 may be provided access via respective user devices. For example, the commerce service 106 may provide network pages that each provide relevant details regarding a particular item(s) ("item detail pages"). A given item detail page may include detailed information regarding an item (e.g., an item being offered for sale), such as one or more images, descriptive text, color name(s), a price, weight, size options, reviews of the item by other users or by professional reviewers, alternative similar items, and/or other information. Reviews of an item from users having the same or similar color preferences to the users accessing the item detail page may be given preferential display (e.g., displayed above or earlier than reviews that are not from users having similar color preferences, highlighted, associated with icons or text indicating the color preference similarity, etc.). The item detail page may also include controls via which the user can select among various versions of the item (e.g., size, color, etc.), and a purchase control via which the user can initiate purchase of the item (e.g., by adding the item to a shopping cart). The commerce service 106 may also provide third party users 140 with interfaces via which the user view information regarding users with similar color preferences, and via which users with similar color preferences can interact (e.g., share opinions on items, share purchase or browse history information, etc.).

While a commerce environment is often used as an example herein, it will be appreciated that the color recommendation service 106, as disclosed herein, may be used in a variety of environments other than a commerce environment. For example, aspects of the present disclosure, in some embodiments, may be used and/or implemented to efficiently recommend colors and color palettes to consumers, merchandisers, designers, architects, artists, landscapers, developers, gamers, students, etc. for virtually any purpose. Without limitation, aspects of the present disclosure may be used for efficient generation of color-based recommendations for use in social networking contexts, digital photo albums, digital news articles, artistic works, content generation, design/architectural drawings, etc. just to name a few practical, non-limiting examples.

The network 120 may include any suitable combination of networking hardware and protocols necessary to establish communications within the color color-related social network recommendation processing environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establishes networking links within the color color-related social network recommendation processing environment 100. Additionally, the network 120 may implement one of various communication protocols for transmitting data between components of the color color-related social network recommendation processing environment 100.

The item data store 130 may be associated with one or more sites and systems, such as a commerce network site providing the color-related social network recommendation service or third party merchandise providers or vendors which may market items via the commerce network site providing the color-related social network recommendation service 102. The item data store 130 may be associated with any computing device(s) that can facilitate communication with the color-related social network recommendation service 102 and the commerce service 106 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The item data store 130 may have metadata/keywords that identify and/or describe the respective items. By way of example, the item data store 130 may store item records for respective items in one or more electronic catalogs including unique item identifiers, such as Universal Product Codes (UPC), European Article Numbers (EAN), International Standard Book Numbers (ISBN), and/or other identifiers. By way of further example, the item metadata may indicate the item type and/or category, such as "dress" and "clothing," or "blender" and "kitchen appliance." In addition, the item metadata may include text identifying one or more colors of the item or of versions of the item, such as "red," "orange," "blue," etc. The metadata may further include such information as brand. Other data, such as price, may be included as metadata or otherwise may accessible. Still further, a given item record may include one or more images of the item, where the image may further be associated with metadata (e.g., identifying items in the image by item type, item category, unique identifier, identifying associated color palettes, etc.). Item record data may have been provided by an operator of a commerce site, by consumers, third party data stores (e.g., databases), and/or other sources. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

The user account data store 132 may store user account information in respective user account records. A given user account record may include user purchase history information, such as the items a user has purchased and related metadata, such as the item color palette, the item types, the item category, the item price etc. A given user account record may also include user submitted data, such as image of the user's wardrobe or images of items the user likes. For example, a user may take images, e.g., photographs and/or videos, of the user's wardrobe (e.g., dresses, shoes, blouses, pants, socks, other items of clothing, handbags, briefcases, earrings, necklaces, other jewelry, other accessories, etc.), and upload the images to a user account data store 132 (which may be provided in a hosted computing environment). The user may have manually provided metadata to be stored in association with the images (e.g., color, item type, item category, product identifiers, etc.). Alternatively or in addition, the color-related social network recommendation service 102 or other service may have automatically recognized via an object identification module the item(s) and its associated colors in a given user image and stored such information as metadata in association with the given user image. The meta-data may also have been semi-manually or semi-automatically provided or generated. In addition, a user account record may store user profile information such as a user's color preferences and preference rankings, as well as a user's instructions regarding sharing information with other users, e.g., other users having similar color preferences. As noted above, the user's color preferences may be determined based on color palettes generated from the user submitted images, on explicit color preference indications provided by the user via surveys or otherwise, on the user's purchase or browse history, on social networking information, and/or other information.

Third party users 140 may correspond to visitors to a network site (e.g., a commerce network site), such as consumers, designers, architects, or the like, and can be associated with any computing device(s) that can facilitate communication with the color-related social network recommendation service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Social networking services 150 may build social networks among users who share real-life connections, interests, and color-related preferences. The social network services 150 may include user profiles and social links with other users and groups, and may enable linked users to share information and communications, including text, audio, and still and video images via social networking pages, emails, short messaging services and otherwise.

One skilled in the relevant art will appreciate that the example components and configurations provided in FIG. 1 are illustrative in nature. Accordingly, additional or alternative components and/or configurations, especially regarding the additional components, systems and subsystems for facilitating functions disclosed herein may be utilized.

Figure 2:
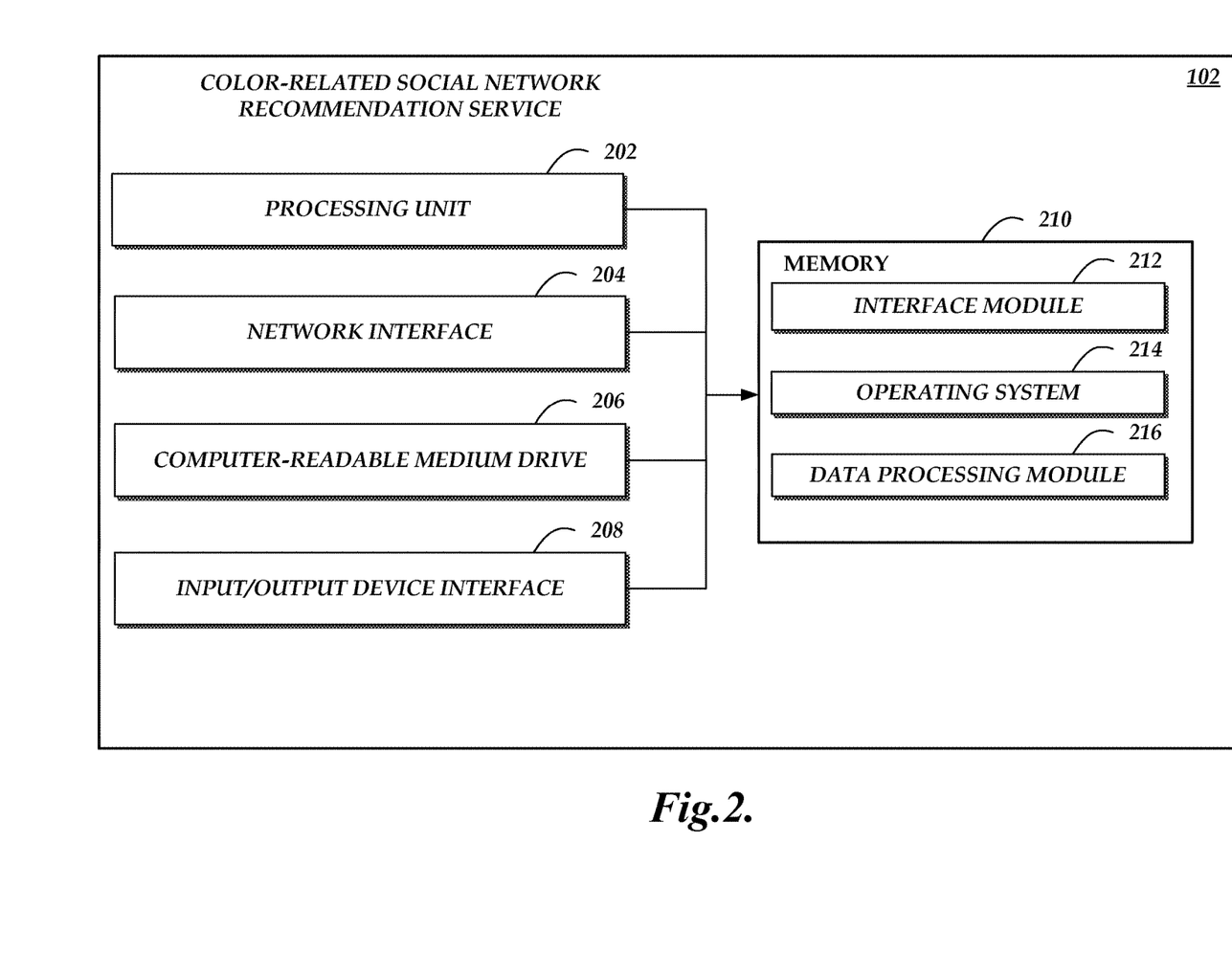
FIG. 2 is a block diagram illustrating an embodiment of example components of a computing system capable of providing the image processing service and/or color-related social network recommendation service shown in FIG. 1.

FIG. 2 is a block diagram illustrating an embodiment of example components of computing system capable of implementing a color-related social network recommendation service 102 utilized in accordance with the color color-related social network recommendation processing environment 100 of FIG. 1. The computing system includes an arrangement of computer hardware and software components that may be used to implement aspects of the present disclosure. Those skilled in the art will appreciate that the computing system implementing the color-related social network recommendation service 102 may include more (or fewer) components than those depicted in FIG. 2. It is not necessary, however, that all of these generally conventional components be shown in order to provide an enabling disclosure.

The computing system implementing the color-related social network recommendation service 102 may include a processing unit 202, a network interface 204, a non-transitory computer-readable medium drive 206, and an input/output device interface 208, all of which may communicate with one another by way of a communication bus. The network interface 204 may provide the color-related social network recommendation service 102 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the color-related social network recommendation service 102. The memory 210 may further include other information for implementing aspects of the present disclosure.

In one embodiment, the memory 210 may include an interface module 212. The interface module 212 can be configured to facilitate generating one or more user interfaces through which an item data store 130 or a third party user 140, utilizing a compatible computing device, may send to, or receive from, the color-related social network recommendation service 102 recommendations, image data, palette data, instruction data, metadata, etc., or otherwise communicate with the color-related social network recommendation service 102. Specifically, the interface module 212 can be configured to facilitate processing functions described herein, including generating palettes from images, determining and ranking user color preferences, identifying users with similar color preferences, enabling users with similar color preferences to network, share information and communicate, etc. For example, color information for a third party user 140 may be obtained from user submitted images, explicit color preference indications provided by the user via surveys or otherwise, via user searches (e.g., where the user search query includes a color name), from the user's purchase history, the user's browse history, from social networking information, and/or other information. The third party user may submit images, color preference information, and may interact with other users having similar color preferences via one or more generated user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In one embodiment, the data processing module 216 implements aspects of the present disclosure. For example, the data processing module 216 can be configured to process user images, instructions, item data from the item data store 130, palette data from the palette data store 110, data from the social networking service 150, or metadata to rank user color preferences and to identify users having similar color preferences.

It should be noted that the color-related social network recommendation service 102 may be implemented by some or all of the components present in the computing system as discussed herein with respect to FIG. 2. In addition, the computing system may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the color-related social network recommendation service 102 and its components can be implemented by web servers, application servers, database servers, combinations of the same, or the like, configured to facilitate data transmission to and from third party users 140 and/or social networking services 150, via network 120. Accordingly, the depictions of the modules are illustrative in nature.

Example routines will now be described with reference to the figures.

Figure 3:
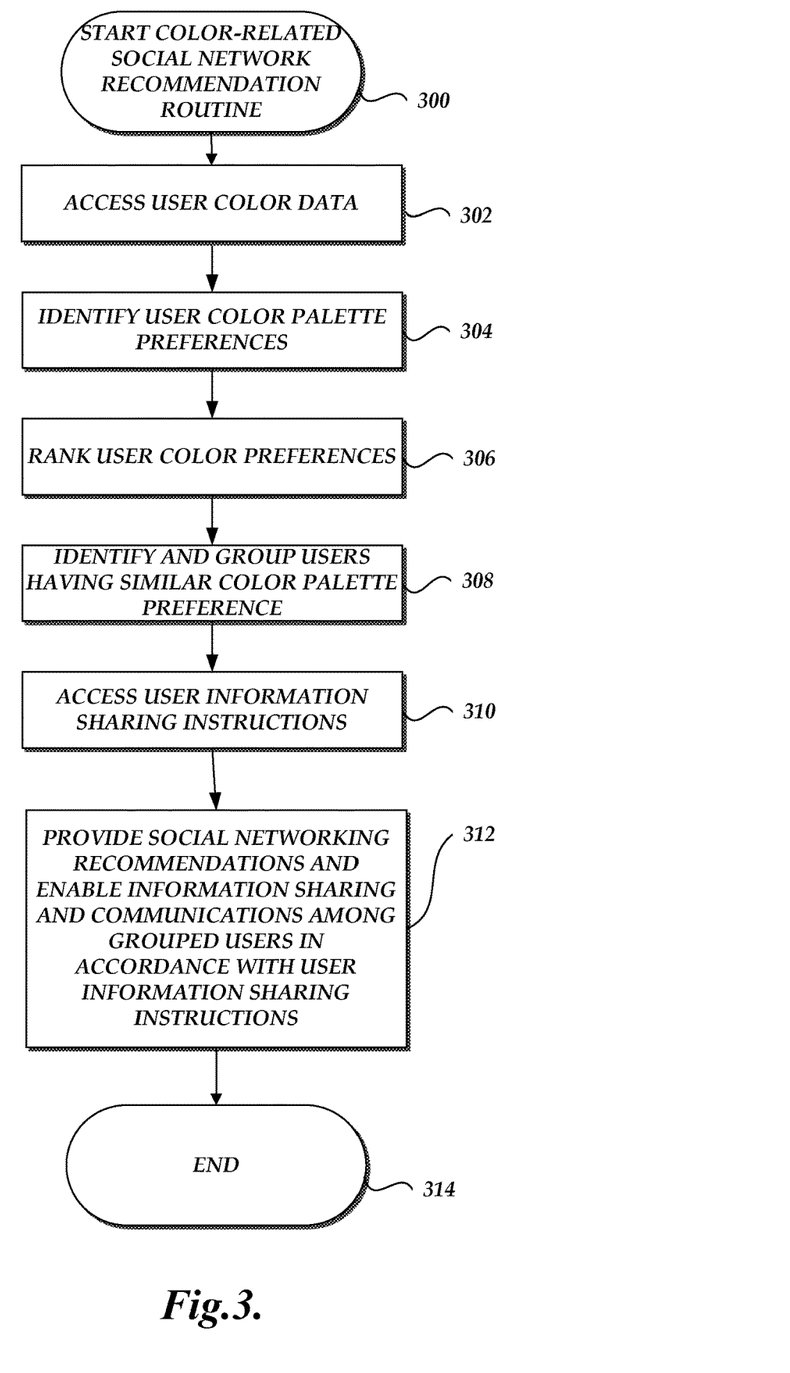
FIG. 3 is a flow diagram illustrating an example routine implemented by the color-related social network recommendation service for providing color-related social network recommendations.

Example Recommendation Process to Generate Color-Related Social Network Recommendations FIG. 3 is a flow diagram illustrating an example routine performed by the color-related social network recommendation service 102 for providing color-related social network recommendations based on user color-related data. The color-related social network recommendation service 102 starts the routine at block 300. At block 302, the routine color-related social network recommendation service 102 accesses user color data, such as color data that may indicate a user's color palette preferences, where a color palette may include one or more colors. By way of example, the user color data may be obtained from user submitted images, such as those that may be stored in the user account data store 132, by a social networking service 150, or elsewhere. The user images may be processed as discussed elsewhere herein to determine corresponding color palettes. By way of further example, user color data may be obtained from the user's browsing and posting history on the social network, such as from keywords on content browsed or posted by the user. For example, if a user posts articles or comments regarding a particular sports team, an inference may be made that the user may be interested in the sports team's colors. By way of further example, the color-related social network recommendation service 102 may provide a color preference survey user interface to a user device configured to prompt the user to indicate the user's preferred color palettes (e.g., the user's 3, 5, or 8 favorite color palettes) and optionally ranking of the user's preferred palettes. As another option, the user may be further prompted via the color preference survey user interface to indicate the user's least favorite color palettes (e.g., the user's 3, 5, or 8 least favorite color palettes). The color-related social network recommendation service 102 may receive and store the user's survey responses in the user account data store 132.

By way of yet further example, the color-related social network recommendation service 102 may access the user's purchase history from the commerce service 106 and/or the user account data store 132 to determine items the user has purchased or browsed, and color information associated with the items. By way of still further example, the color-related social network recommendation service 102 may access the user's social networking page from social networking services 150, access posted images of items that the user has indicated she likes (e.g., by providing a "like", thumbs up, or other positive indication with respect to the images) and process the images as discussed elsewhere herein to determine corresponding color palettes.

At block 306, the color-related social network recommendation service 102 ranks the user's color preferences identified at block 304. If the color information is received from multiple sources, such as discussed above, the color preference information from the variety of sources may be combined to form a unified color preference determination. For example, a color preference score may be generated for a given color palette from color preference information regarding the given color palette from the variety of sources. Various color palettes may be ranked based on their relative score. In generating a unified color preference determination, color preference information from certain sources may be weighted differently than color preference information from other sources. The color preference indications may also be normalized. Optionally, the color information from different sources may be weighted the same. An example formula for calculating a color preference score from color preference indications of a ColorPreferenceSource from 1 to n sources with corresponding weightings is as follows:

Color Preference Score=Σ
 (weight$_1$*ColorPreferenceSource$_1$+
 weight$_2$*ColorPreferenceSource$_2$ . . .
 weight$_n$*ColorPreferenceSource$_n$)

Optionally, in order to identify colors the user may potentially like, the color-related social network recommendation service 102 may identify clusters of colors within a color space of colors between those colors the user prefers (e.g., the user's top ranked three colors) and those colors the user does not like (e.g., the user's bottom ranked three colors).

At block 308, users that have similar color preferences are determined according to one or more color preference rules. By way of illustration, in accordance with a color preference rule, the color-related social network recommendation service 102 may identify users that have the same most preferred color palette, and/or may identify users that have the same or sufficiently similar ranking of multiple preferred color palettes, for at least a portion of the user's ranking (e.g., the top four ranked color palettes). By way of illustration, the color-related social network recommendation service 102 may identify users that have the same most preferred color palette, and/or may identify users that have the same color palettes in a group of color palettes, although they may have different ranking orders within the group. As another example, the color-related social network recommendation service 102 may identify users that have the same most preferred palette and the same next two most preferred palettes, even though the ranking of the next two most preferred palettes may differ. In this example if User 1 and User 2 have the same most preferred palette (palette A), and User 1's second most preferred palette is palette B and third most preferred palette is palette C, while User 2's second most preferred palette is palette C and third most preferred palette is palette B, then User 1 and User 2 will be identified as "matching users" with similar enough tastes in palettes so as to be grouped together for one or more of the services discussed herein. Optionally, users with the same or sufficiently similar color preferences may be assigned to a group for purposes of one or more services (e.g., information sharing and communications among users assigned to a group). The group may be a color-based group that is associated with one or more color palettes used to define the group.

Optionally, a user may define via a user interface a color preference rule specifying how closely or loosely another user's color preferences need to be in order for one or more of user interaction services to be provided with respect to the user. As yet another option, a system operator provides such definition or both a user and a system operator may contribute to the definition of how closely or loosely another user's color preferences need to be in order for one or more of user interaction services to be provided with respect to the user. Such definitions may be accessed and used by the color-related social network recommendation service 102 in determining whether a given user is to be assigned to a given color-based group. For example, the user's definition may be accessed from the user's account record stored in user account data store 132.

Optionally, a color palette may be considered the same as a different color palette if their respective primary colors are within a threshold distance. For example, the threshold may indicate a maximum color distance, wherein if the respective primary colors are less than the maximum color distance apart, color palettes are considered the same color palettes for purposes discussed herein. Thus, if two users ranked two different color palettes as their most preferred palettes, but the two color palettes are within a specified threshold, the color palettes may be considered the same. As yet another option, the threshold may be specified by the user via a user interface, a system operator, or otherwise. For more example details on determining color distance, see U.S. patent application Ser. No. 14/316,483, entitled "IMAGE-BASED COLOR PALETTE GENERATION," filed on Jun. 26, 2014; and U.S. patent application Ser. No. 14/316,292, entitled "BUILDING A PALETTE OF COLORS BASED ON HUMAN COLOR PREFERENCES," filed on Jun. 26, 2014, each of which is incorporated by reference herein in its entire.

Optionally, users may be identified that do not have similar color preferences as the user, but do have color preferences corresponding to the colors that have been identified at block 306 as colors that the user may potentially like. Such users may be able to inspire the user to expand the user's color preferences by sharing items and color-related recommendations that do not corresponds to the user's current preferred colors.

At block 310, the user's information sharing instructions are accessed. For example, the user's information sharing instructions may be accessed from the user's account record stored in user account data store 132 or may be dynamically specified by the user via a user interface. The information instructions may indicate one or more of the following:

whether the user is to be identified to other users in a color-based group;

whether all of the user's purchases made via one or more commerce services (e.g., commerce service 106) are to be shared with other users in a color-based group;

whether the user's purchases of items, made via one or more commerce services (e.g., commerce service 106), having a color palette used in defining the group are to be shared with other users in a color-based group;

whether the user is willing to receive communications from other members of the color-based group and in what form (e.g., via the user's social networking page, via a short messaging service, via an email, or otherwise);

whether the user is willing to receive still and/or video images from other members of the color-based group;

whether the user is willing to receive color palette recommendations;

whether the user is willing to receive survey/opinion requests from other members of the color-based group; and/or whether the user is willing to receive opinions/reviews from other members of the color-based group.

At block 312, the color-related social network recommendation service 102 enables the user to receive and provide information and communications to other members of the color-based group in conformance with the user instructions discussed above with respect to block 310. The information and communications may be provided via pages served by the commerce service 106, the social networking services 150, via email, short messaging services (e.g., SMS messages), audible communications, and/or otherwise. For example, the color-related social network recommendation service 102 may recommend the user to other users as recommended social networking partners or group members. The color-related social network recommendation service 102 may identify other members of the color-based group to the user. The color-related social network recommendation service 102 may identify and recommend to the user other users having the same or similar color preferences with whom the user can selectively network.

Optionally, the color-related social network recommendation service 102 may generate and provide recommendations, such as recommendations of items available from the commerce service 106, to members of a color-based group based at least in part on the color palettes associated with the group and/or group members. For more example details on providing color-based item recommendations, see U.S. patent application Ser. No. 14/315,855, entitled "AUTOMATIC COLOR PALETTE BASED RECOMMENDATIONS," filed on Jun. 26, 2014; and U.S. patent application Ser. No. 14/315,819, entitled "AUTOMATIC COLOR PALETTE BASED RECOMMENDATIONS," filed on Jun. 26, 2014, each of which is incorporated by reference herein in its entirety.

The color-related social network recommendation service 102 ends the routine at block 314.

Example Palette Generation Process

Figure 4:
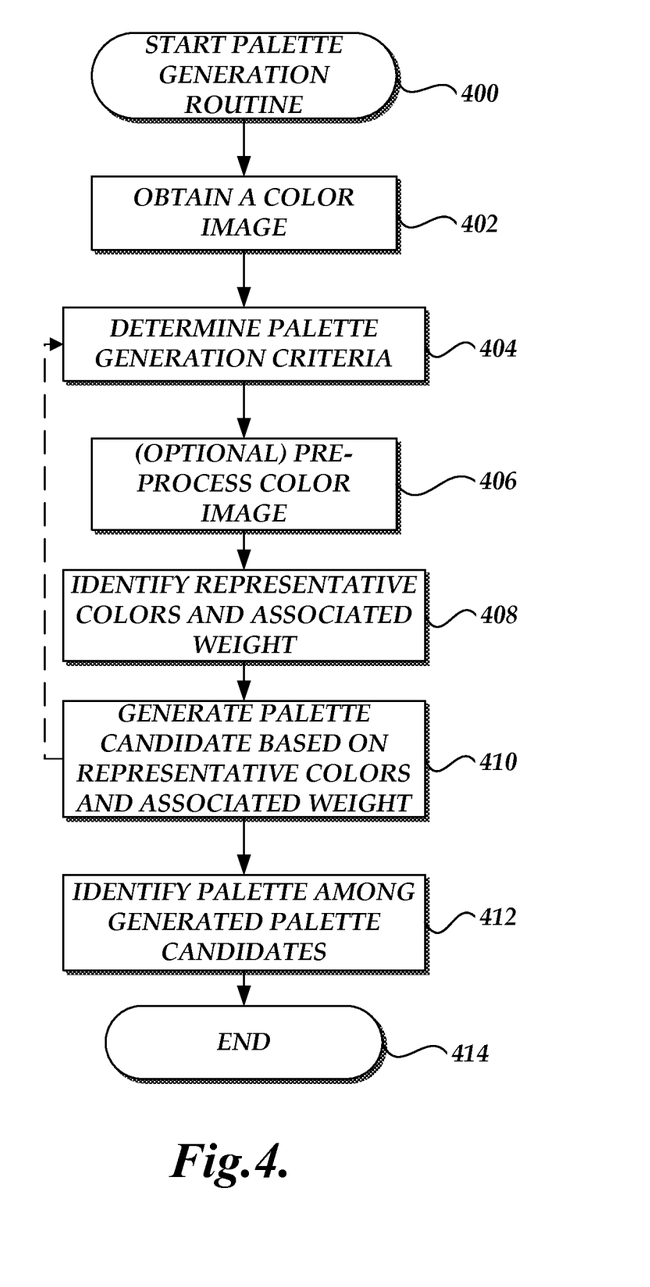
FIG. 4 is a flow diagram illustrating an embodiment of a palette generation routine implemented by the image processing service.

FIG. 4 is a flow diagram illustrating an embodiment of a palette generation routine 400 implemented by an image processing service 104. Routine 400 begins at block 402, where the image processing service 104 obtains a color image. The color image can depict one or more items, a design, a scene, a landscape, or any other content of color. Obtaining the color image can be accomplished by receiving image data from image sources, such as from item data store 130, user account data store 132, third party users 140, of via image data transmission to the image processing service 104.

Metadata associated with the color image can also be obtained. The metadata may include information corresponding to the colors, color scheme, lighting source, lighting direction, or other factors regarding the color rendering of the image. The metadata may also include information about currently obtained color image, other color images, subjects or category of subjects depicted, sources contributing to the image, or their interrelations. The metadata can further include any other information associated with the color image as can be envisioned by a person of skill in the art.

At block 404, palette generation criteria are determined. The palette generation criteria can be inputted by an image source provider or a third party user 140, who may correspond to a host of a commerce network site, a merchandise provider or vendor, a visitor to the commerce network site, a consumer, a designer, an artist, an architect, or the like. Alternatively, or in addition, the palette generation criteria can be automatically generated by the image processing service 104, or another computing device or system. For example, features or patterns exhibited by the color image as well as associated metadata can be considered by an automated process to determine the palette generation criteria.

The palette generation criteria may indicate various preferences, factors, parameters, thresholds, or requirements that facilitate or control the palette generation routine 400 performed by image processing service 104. For example, the palette generation criteria may indicate a computational method for pre-processing the obtained color image, for generating a color distribution, for identifying representative colors, for generating palette candidates, or for determining a palette. The palette generation criteria may also indicate parameters, thresholds, restraints, formula, or other factors that may inform various computational methods applicable to routine 400 or subroutines that it may invoke. For example, the palette generation criteria can identify color distance formula(e) or can include one or more thresholds of color distance for merging similar colors when representative colors are identified from a color image.

In some embodiments, the obtained color image is pre-processed at block 406. For example, the color image may be converted to a format compatible with the palette generation routine 400 or its subroutines. The color image may also be classified or prioritized based on applicable metadata. Further, pre-processing can include noise removal, rotation, re-orientation, normalization in shape, size, resolution, or color, or other manipulations to facilitate relevant processes and methods.

Still further, pre-processing may include area marking or labeling within the color image. For example, various contour matching algorithms can be employed to automatically mark out an area of interest. Alternatively, or in addition, areas of interest can be manually, semi-manually, or semi-automatically marked out. In some embodiments, a background can be removed during pre-processing through area marking or labeling. In another embodiment, one or more areas of interest can be cropped or extracted so that only these areas form the basis for palette generation. In still another embodiment, area marking or labeling may indicate colors that should be treated in a specific way, such as to be ignored, to be associated with more or less weight, to disambiguate to a greater or lesser extent. Information corresponding to pre-processing can be included in corresponding metadata that is associated with the color image, which can facilitate palette generation.

At block 408, representative colors and their associated weight are identified from the obtained color image. The identification of representative colors may include multiple subroutines or sub-elements. Various image processing or clustering algorithms can be employed to achieve this. In some embodiments, a color distribution, such as a histogram illustrating distinct colors with their corresponding weight, is generated based on the color image. For example, the color distribution can be generated by invoking subroutine 400 as illustrated in FIG. 4 and as will be further described below. The generation of color distribution can be facilitated or controlled by information included in the palette generation criteria. For example, the palette generation criteria can indicate a set of standardized colors and/or binning criteria as bases for generating the color distribution. Once the color distribution is generated, representative colors can be identified based on the color distribution. The identification of representative colors can be facilitated or controlled by information included in the palette generation criteria or the metadata associated with the color image.

At block 410, a palette candidate is generated to include at least a subset of the identified representative colors and their associated weight. The color palette candidate may further include metadata associated with the identified representative colors and weight.

In some embodiments, the palette generation criteria may specify or indicate criteria for determining which identified representative colors can be included in a palette candidate. For example, identified representative colors can each be associated with a weight. The palette generation criteria may indicate a threshold on the weights associated with identified colors to filter out colors that are relatively insignificant in the color image. The threshold can be dynamically generated based on a weight distribution of the identified representative colors. For example, the palette candidate can exclude identified representative colors associated with a weight lower than two standard deviations from a mean weight. Optionally, image processing service 104 can move back to block 404, where new palette generation criteria can be determined. Based on the new palette generation criteria, a new palette candidate can be generated.

At block 412, one or more palettes can be identified among previously generated palette candidate(s). In some embodiments, each generated palette candidate is automatically considered a final palette so additional identification is not required at block 412. In other embodiments, one or more palettes are identified among multiple palette candidates based on palette generation criteria that may indicate whether the identification should be performed manually, semi-manually, semi-automatically, or automatically, which attributes should be examined, or what standards should be applied to the identification, or the like.

Identification of color palettes can be accomplished manually, semi-manually, semi-automatically, or automatically. For example, by repeating the part of routine 400 from block 404 to block 410, a third party user 140 may experiment with various palette generation criteria settings that can lead to generation of multiple palette candidates. In other words, each generated palette candidate can correspond to a distinct setting of palette generation criteria. The third party user 140 may then select one or more of the candidates and label them as palettes associated with the color image. Alternatively, or in addition, the identification of color palettes can be accomplished automatically by the image processing service 104, or by another computing device or system. For example, information associated with change of color values and associated weight across various palette candidates can be considered a function of certain settings included in palette generation criteria corresponding to the various palette candidates. Accordingly, various optimization algorithms, such as gradient methods, dynamic programming, evolutionary algorithms, combinatorial optimization, or stochastic optimization, can be utilized to pick a palette candidate(s) that achieves an optimization based on the function. Illustratively, a palette candidate can be selected if a corresponding rate of color value change is close to zero, as measured in accordance with the function.

Once identified, the one or more palettes can be stored at the palette data store 110, either by creating new data entries or updating existing palettes. The image processing service 104 then ends the routine at block 714. Depending on relevant requirements or preferences indicated in the palette generation criteria corresponding to identified palettes, various metadata can be associated therewith, for purposes of indicating their format, semantics, features, conditions, or the like. In some embodiments, metadata can link a palette to a corresponding color image from which the color palette is derived. Alternatively, or in addition, metadata may indicate a category or a position in a taxonomy associated with the corresponding color image. Metadata can also indicate patterns, colocations, or other attributes of spatial distribution of palette colors within the corresponding color image.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising: under control of a hardware computing device configured with specific computer-executable instructions;
   monitoring interactions over a network, of a first user using a first device, with content associated with one or more colors;
   determining, using the computing device, a color preference of the first user based at least in part on:
   color palettes associated with images of items viewed by the first user over the network or that the first user has liked on social networking sites;
   wherein each color palette is created by at least:
      applying color palette generation criteria to the images to identify representative colors and associated weights;
      generating one or more color palette candidates using the identified representative colors and associated weights; and
      creating a color palette from the generated one or more color palette candidates:
   comparing, using the computing device, the determined color preference of the first user with color preference information of a second user; and
   based at least on the comparison of the color preference of the first user with the color preference information of the second user, facilitating interactions over a network between the first user and the second user.

2. The computer-implemented method of claim 1, wherein determining a color preference of the first user further comprises determining the color preference of the first user from at least one of:
   an image received from the first user, or
   an image of an item purchased by the first user.

3. The computer-implemented method of claim 1, wherein facilitating interactions over a network between the first user and the second user comprises providing the first user with a social networking recommendation with respect to the second user.

4. The computer-implemented method of claim 1, wherein facilitating interactions between the first user and the second user further comprises providing an indication to the second user when the first user has at least one of: browsed a first item associated with the determined color preference or purchased a first item associated with the determined color preference.

5. The computer-implemented method of claim 1, wherein facilitating interactions between the first user and the second user further comprises enabling the first user to share a color information with the second user.

6. The computer-implemented method of claim 1, wherein the color preference of the first user is determined based at least in part on one or more colors of an item purchased by the first user, wherein the one or more colors of the item purchased by the first user is determined using data from a corresponding purchase record.

7. The computer-implemented method of claim 1, wherein the color preference information of the second user is determined based at least in part on color related search queries submitted by the second user.

8. The computer-implemented method of claim 1, the method further comprising:
identifying a third user having color preference information different than the color preference information of the second user;
comparing the determined color preference of the first user with color preference information of the third user; and
based at least on the comparison of the color preference of the first user with the color preference Information of the third user, facilitating interactions over a network between the first user and the third user.

9. The computer-implemented method of claim 1 further comprising:
identifying a first plurality of color palettes associated with the first user, wherein a given color palette comprises an identification of one or more colors; and
ranking the first plurality of color palettes to correspond to a determined color palette preference of the first user;
wherein comparing the determined color preference of the first user with color preference information of the second user comprises a comparison of the ranking of the first plurality of color palettes with a color palette ranking associated with the second user.

10. The computer-implemented method of claim 1, wherein determining a color preference of the first user further comprises determining the color preference of the first user based on an image accessed from a data store of images of a wardrobe of the first user.

11. A non-transitory computer-readable storage medium storing computer-executable instructions that when executed by a processor perform operations comprising:
monitoring interactions over a network, of a first user using a first device, with content associated with one or more colors;
determining a color preference of the first user based at least in part on:
color palettes associated with one or more images of items browsed by the user over the network, or
color palettes associated with one or more images of items the user has liked on social networking sites;
wherein a given palette associated with one or more images of items browsed by the user over the network or one or more images of items the user has liked on social networking sites is determined by at least:
determining palette generation criteria;
identifying representative colors and associated weights;
generating one or more palette candidates using the identified representative colors and associated weights;
determining a palette from the generated one or more palette candidates;
comparing the determined color preference of the first user with color preference information of a second user; and
based at least one the comparison of the color preference of the first user with the color preference information of the second user,
facilitating interactions over a network between the first user and the second user.

12. The non-transitory computer-readable storage medium of claim 11, wherein determining a color preference of the first user further comprises determining the color preference of the first user from at least one of:
an image received from the first user, or
an image of an item purchased by the first user.

13. The non-transitory computer-readable storage medium of claim 11, wherein facilitating interactions over a network between the first user and the second user comprises providing the first user with a social networking recommendation with respect to the second user.

14. The non-transitory computer-readable storage medium of claim 11, wherein facilitating interactions between the first user and the second user further comprises providing an indication to the second user when the first user has purchased a first item associated with the determined color preference.

15. The non-transitory computer-readable storage medium of claim 11, wherein the color preference of the first user is determined at least in part based on one or more colors of an item purchased by the first user, wherein the one or more colors of the item purchased by the first user is determined using data from a corresponding purchase record.

16. The non-transitory computer-readable storage medium of claim 11, wherein the color preference Information of the second user is determined based at least in part on color related search queries submitted by the second.

17. The non-transitory computer-readable storage medium of claim 11, the operations further comprising:
identifying a first plurality of color palettes associated with the first user, wherein a given color palette comprises an identification of one or more colors; and
ranking the first plurality of color palettes to correspond to a determined color palette preference of the first user;
wherein comparing the determined color preference of the first user with color preference Information of the second user comprises a comparison of the ranking of the first plurality of color palettes with a color palette ranking associated with the second user.

* * * * *

UNITED STATES PATENT AND TRADEMARK OFFICE
CERTIFICATE OF CORRECTION

PATENT NO. : 10,169,803 B2  
APPLICATION NO. : 14/315866  
DATED : January 1, 2019  
INVENTOR(S) : Charles Shearer Dorner Page 1 of 1

It is certified that error appears in the above-identified patent and that said Letters Patent is hereby corrected as shown below:

In the Specification

Column 15, Line 12, delete "entire." and insert --entirety.--.

In the Claims

Column 20, Line 47, Claim 1, delete "candidates:" and insert --candidates;--.

Column 21, Line 30, Claim 8, delete "Information" and insert --information--.

Column 22, Lines 46-47, Claim 16, delete "Information" and insert --information--.

Column 22, Line 48, Claim 16, delete "second." and insert --second user.--.

Column 22, Line 58, Claim 17, delete "Information" and insert --information--.

Signed and Sealed this  
Nineteenth Day of May, 2020

Andrei Iancu  
*Director of the United States Patent and Trademark Office*